J. Fox,
Manf. Shovels.
No. 96,572. Patented Nov. 9, 1869.
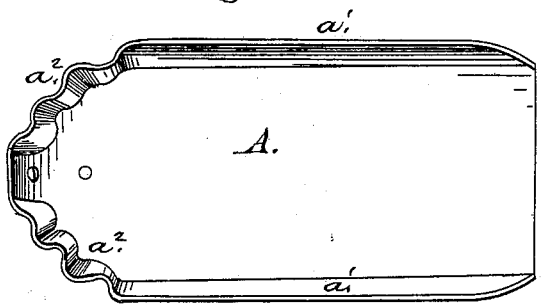
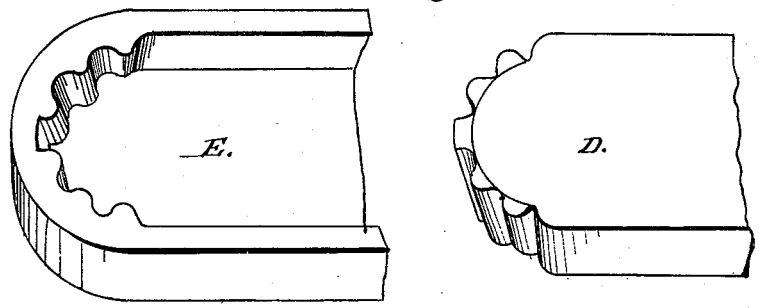

UNITED STATES PATENT OFFICE.

JOHN FOX, OF NEW YORK, N. Y.

IMPROVEMENT IN MANUFACTURING SHOVELS.

Specification forming part of Letters Patent No. 96,572, dated November 9, 1869.

*To all whom it may concern:*

Be it known that I, JOHN FOX, of the city, county, and State of New York, have invented a new and useful Improvement in Fire-Shovels; and I do hereby declare that the following is a full, clear, and exact description thereof, which will enable others skilled in the art to make and use the same, reference being had to the accompanying drawings, forming a part of this specification.

The invention consists in peculiarly-constructed dies for the manufacture of fire-shovels, and also of a product whose form and the manner in which it is brought into shape render it a very superior article for public use.

In Figure 1 of drawings, D E represent the dies in which the shovel is made, which are constructed with corresponding corrugations, as shown. The actuating-die D is a drop or percussion instrument, whereby and by virtue of the form of dies the shovel is completed at a single blow.

In Fig. 2, A is the shovel, the sides $a'$ of which are turned up in the ordinary manner, and the back $a^2$ of which is turned up and corrugated, as shown in the figure.

In forming the shovel in the ordinary manner it is necessary to strike the plate at least three times to bring the shovel to the desired form, for if it should be attempted to form the shovel with a less number of blows the metal would wrinkle under the action of the dies and the shovel would be spoiled.

By forming corrugations in the back of the shovel, as herein described, the said corrugations take up the slack of the metal and enable the shovel to be formed at one blow, thus materially lessening the cost of construction, while at the same time a stronger and better shovel is produced.

Having thus described my invention, what I claim as new, and desire to secure by Letters Patent, is—

1. The combination of the corrugated female die E with the correspondingly-corrugated male drop-die D, operating together as and for the purpose specified.

2. An improved fire-shovel, A, corrugated at the back or point of strain in the manner shown and described.

The above specification of my invention signed by me this 31st day of March, 1868.

JOHN FOX.

Witnesses:
J. ALLISON FRASER,
JAMES T. GRAHAM.